Figure 1:
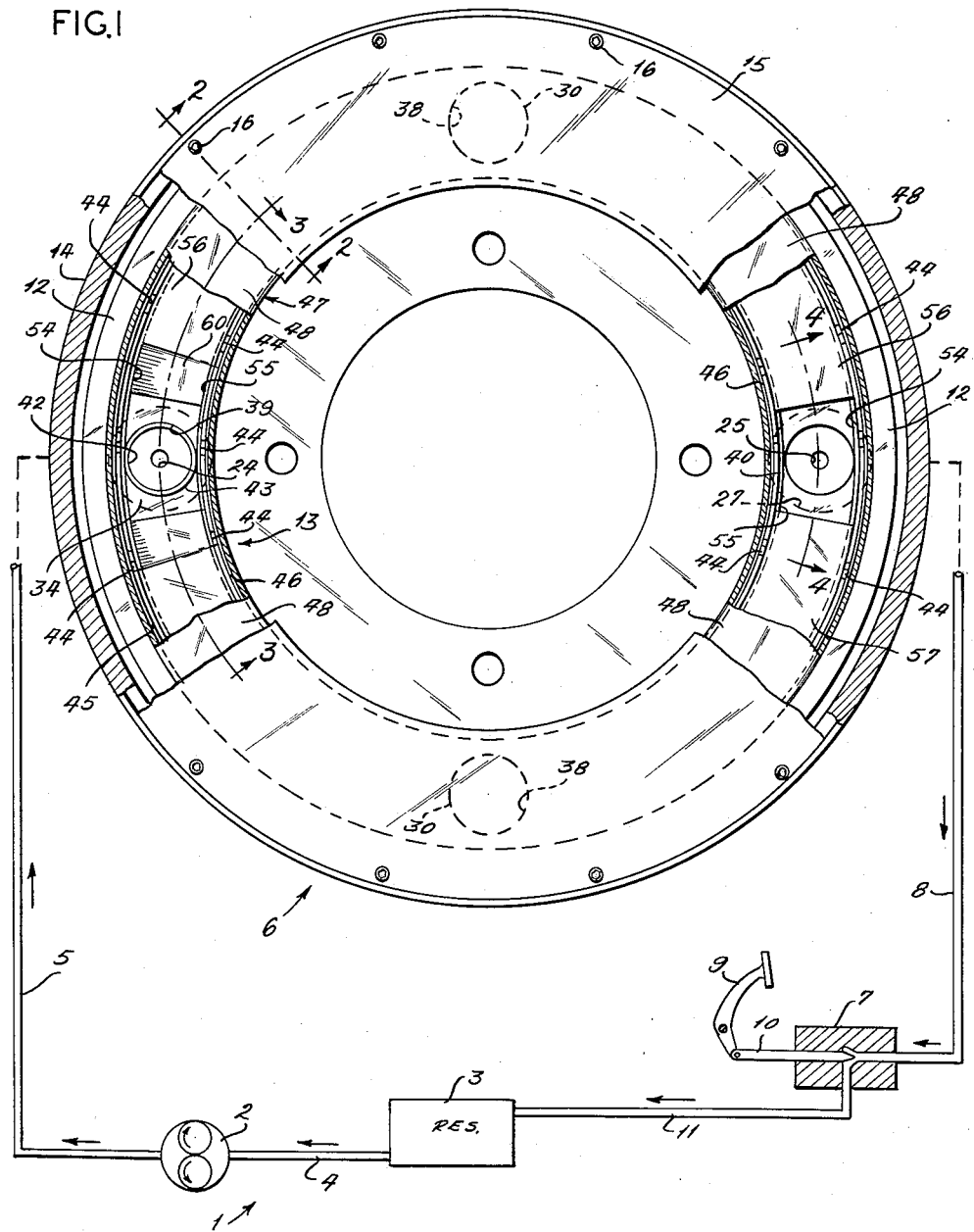

Dec. 13, 1960 S. SCHNELL 2,964,136
ANNULAR PISTON ASSEMBLY FOR A DISC BRAKE
Filed July 15, 1957 2 Sheets-Sheet 1

INVENTOR:
STEVE SCHNELL
By Gravely, Lieder, Woodruff & Wills
ATTORNEYS.

Dec. 13, 1960          S. SCHNELL          2,964,136
ANNULAR PISTON ASSEMBLY FOR A DISC BRAKE
Filed July 15, 1957          2 Sheets-Sheet 2
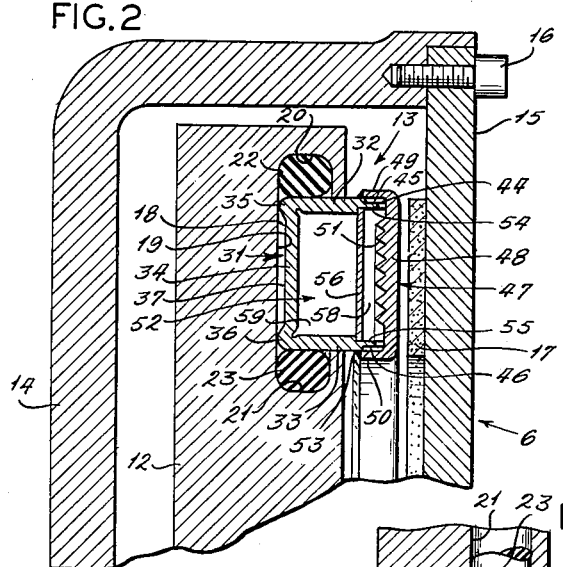
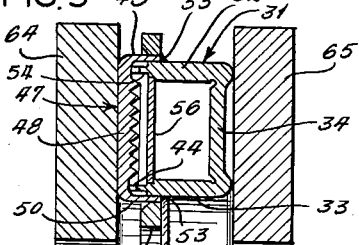
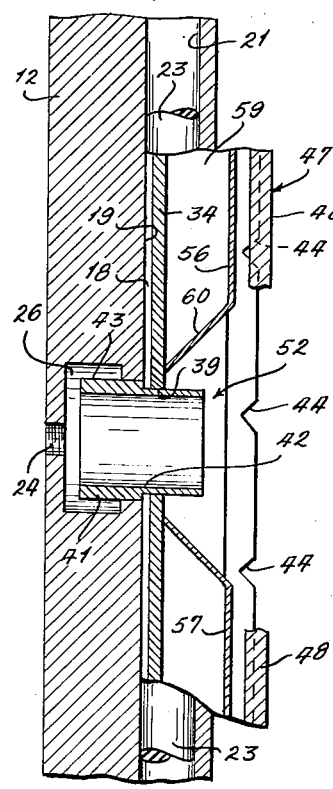
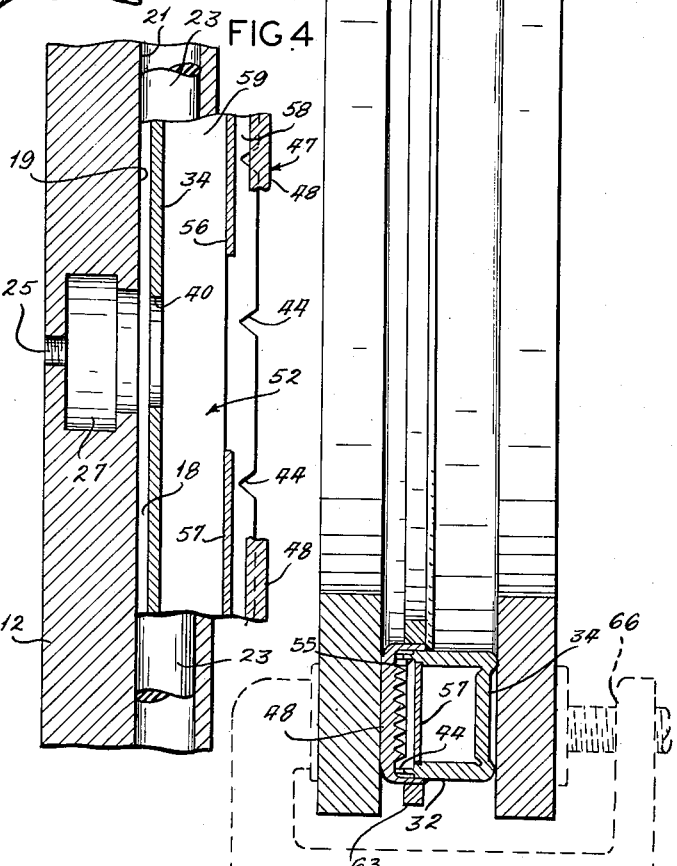
INVENTOR:
STEVE SCHNELL
By Gravely, Lieder, Woodruff & Wills
ATTORNEYS.

United States Patent Office 2,964,136
Patented Dec. 13, 1960

2,964,136

ANNULAR PISTON ASSEMBLY FOR A DISC BRAKE

Steve Schnell, St. Louis, Mo., assignor to Wagner Electric Corporation, St. Louis, Mo., a corporation of Delaware Filed July 15, 1957, Ser. No. 671,953

8 Claims. (Cl. 188—71)

This invention relates to disc brakes and in particular to an annular piston assembly therefor.

In the past, annular piston assemblies for disc brakes have been devised in which the pressure fluid is also employed as a cooling medium, but none of them has been entirely satisfactory. The primary difficulty encountered heretofore was undesirable piston distortion due to the extreme heat generated during a braking application and the limited pressure fluid circulation through the annular piston assembly for cooling purposes. In addition to causing piston distortion, such extreme heat causes deterioration of the fluid seals or gaskets employed in the annular piston assembly.

An object of the instant invention is to provide an annular piston assembly which obviates the disadvantages of the prior art constructions.

Another object of the instant invention is to provide a novel piston construction which permits unequal metal expansion between the piston and friction plate, but which prevents permanent distortion of said piston and friction plate.

Still another object of the instant invention is to provide a piston assembly in which a maximum area of the friction plate is exposed to the cooling medium.

A still further object of the instant invention is to provide an improved method of producing annular piston assemblies.

These and other objects and advantages will become apparent hereinafter.

Briefly, the present invention is embodied in an annular piston assembly including piston and friction plate members defining an internal chamber for pressure fluid and having telescoped side walls, an expansion chamber formed between the telescoped side walls, and passage means in the piston side walls providing communication between the expansion chamber and the internal chamber whereby pressure fluid can flow in the expansion chamber. The invention also consists in the method of forming the piston assembly including applying opposing forces maintaining the friction plate and piston members together, applying a compressive force holding the side walls of the members in surface abutment, and providing means sealingly securing the side walls of the members together.

The invention consists in the parts and in the combinations and arrangements of parts hereinafter described and claimed. The invention also consists in the method of assembling the parts of the article, as set forth in the following description.

In the accompanying drawings which form a part of the present disclosure and wherein like numerals refer to like parts wherever they occur:

Fig. 1 is a diagrammatic view of a hydraulic brake system showing a partial section of a piston assembly embodying the instant invention, Fig. 2 is an enlarged fragmentary cross-sectional view of the piston assembly taken substantially along line 2—2 of Fig. 1, the piston assembly being shown in association with stationary and rotatable members of a disc brake, Fig. 3 is an enlarged fragmentary cross-sectional view of the piston assembly taken along line 3—3 of Fig. 1, Fig. 4 is an enlarged fragmentary cross-sectional view of the piston assembly taken along line 4—4 of Fig. 1, and Fig. 5 is a sectional view showing the preferred embodiment in cross section during manufacture to illustrate the present method therefor.

Referring now to the drawings in detail, it will be seen in Fig. 1 that a hydraulic brake system 1 includes a pumping means 2 in communication with a pressure fluid reservoir 3 through a conduit 4. The pumping means 2 is also connected by a conduit 5 to the inlet of a disc brake 6, the outlet thereof being connected to a pressure control valve 7 by a conduit 8. The control valve 7 is provided with a manually actuated lever 9 which is adapted to move a throttling rod element 10 toward a flow throttling or restricting position in the control valve 7 to establish a pressure differential across the control valve or between the pumping means 2 and the control valve 7 thereby developing a braking pressure in the disc brake 6. The control valve 7 is also connected to the reservoir 3 by a return conduit 11.

Referring now to Figs. 1, 2, 3 and 4, the disc brake 6 includes a stationary annular housing 12 secured in a usual manner to a vehicle frame (not shown) and adapted to receive a piston assembly 13. The disc brake 6 also includes a rotatable drum member 14 secured in a usual manner to the axle or wheel (not shown) of the vehicle. An annular brake disc or shoe 15 is secured to the drum member 14 by suitable means, such as studs 16, and carries a friction lining 17 in position to be engaged by the piston assembly 13 to effect a braking application.

The housing 12 is provided with an annular axially extending channel 18 having a base wall 19 and radially extending side channels 20 and 21 which receive O rings 22 and 23, respectively, for sealing contact with the piston assembly 13. The inlet and outlet 24 and 25 of the disc brake 6 are formed in diametral alignment in the housing 12 and are in communication with the housing channel 18 through inlet and outlet cavities 26 and 27. The housing 12 is also provided with diametrally aligned anchor means 30 for preventing rotation of the piston assembly 13 under torque imparted thereto during a braking application, the anchor means 30 being cylindrical plugs fixedly positioned in the channel base wall 19 of the housing 12.

The annular piston assembly 13 comprises a piston member 31 that is U-shaped or channel-shaped in cross-section and includes axially-extending radially-spaced side walls 32 and 33 interconnected by a base wall 34, which includes annular peripheral ribs 35 and 36 defining a recess 37 therebetween. The base wall 34 of the piston 31 is provided with diametrally-aligned anchoring apertures 38 in which the fixed anchoring means 30 of the housing 12 are received to prevent rotation of the piston assembly 13 relative to the housing 12. An inlet opening 39 is formed in the piston base wall 34 in alignment with the inlet cavity 26 of the housing 12, and an outlet opening 40 is also formed in the base wall 34 in alignment with the housing outlet cavity 27. A sleeve 41 having a bore 42 and a stepped outer surface 43 is pressed into fixed engagement with the piston inlet 39 and the enlarged portion of said outer surface is slidably received in the inlet cavity 26 of the housing 12. The piston 31 is positioned in the channel 18 of the housing 12 between the side channels 20 and 21 with the seals 22 and 23 in sealing contact with the remote or outer surfaces of the piston side walls 32 and 33. The ribs 35 and 36 of the piston 31 normally abut the base wall 19 of the channel 18 so that the piston base wall 34 is spaced from the channel base wall 19. The free ends of the piston side walls 32 and 33 are provided with a plurality of spaced cross-passages or slots 44, and peripheral expansion grooves 45 and 46 are formed in the remote or outer surfaces of the side walls 32 and 33 in communication with the cross-passages 44.

The piston assembly 13 also comprises a friction plate 47 which is preferably formed of a relatively thin, annular, metal plate having high heat conductivity properties. The plate 47 includes a base wall 48 with radially-spaced axial flanges or side walls 49 and 50, the base wall 48 having a plurality of annular cooling fins 51 or the like on the inner surface thereof. The friction plate 47 is secured to the open end of the piston 31 opposite the piston base wall 34 to define a closed chamber 52 therebetween, the free ends of the piston side walls 32 and 33 abutting the interior surface of the plate base wall 48 adjacent to the plate flanges 49 and 50. The free ends of the plate flanges 49 and 50 extend axially past the expansion grooves 45 and 46 and are in telescopic surface abutment with the remote or outer surfaces of the piston side walls 32 and 33. Annular filet welds 53 or the like may be provided for securing the piston 31 and the friction plate 47 in fixed telescopic relationship. It is apparent that substantially the entire interior surface of the friction plate 47 is exposed to the chamber 52 either directly or through the cross-passages 44 and the peripheral expansion grooves 45 and 46.

The inner or adjacent surfaces of the piston side walls 32 and 33 are provided with aligned circumferential grooves 54 and 55 in which a pair of baffles 56 and 57 are fixedly positioned in circumferential alignment, the baffles 56 and 57 dividing the chamber 52 into a circulatory chamber 58 defined between said baffles and the friction plate 47 and a static chamber 59 defined between said baffles and the piston base wall 34. One end portion of each of the baffles 56 and 57 is provided with an annular flange or wing 60 (Fig. 3) having a free end margin in contact with the piston base wall 34, the wings being in contact with the base wall 34 on diametrally opposed sides of the sleeve 41 and diverging therefrom. The other end portion of baffles 56 and 57 terminates adjacent to the outlet 40 in the piston base wall 34, but no flange or the like is formed thereon in order to provide pressure fluid access to the static chamber 59. In this manner, the baffles 56 and 57 direct pressure fluid from the inlet cavity 26 toward the circulatory chamber 58 permitting the pressure fluid circulating from the inlet 24 to the outlet 25 to act as a cooling medium to carry off any heat created in the friction plate 47 due to a braking application. The baffles 56 and 57 increase the velocity of the pressure fluid flow through the circulating chamber 58 not only to enhance the "scrubbing action" of said flow to prevent a minute gaseous layer from forming on the inner surface of the friction plate base wall 48 but also to improve the heat transfer from the friction plate 47.

In operation, pressure fluid is pumped by the pumping means 2 from the reservoir 3 through conduits 4 and 5 to the inlet 24 and cavity 26 of the dic brake housing 12. The pressure fluid flows through the sleeve bore 42 in the piston assembly 13 and circumferentially through the circulating chamber 58 and the expansion grooves 45 and 46 to the piston outlet 40. The pressure fluid then flows from the piston outlet 40 into the housing channel 18 and from the outlet cavity 27 and outlet 25 through the conduit 8 to the control valve 7. When the throttling rod element 10 is not in fluid restricting position, the pressure fluid flows freely into the conduit 11 and back into the reservoir 3.

When the lever 9 is actuated to restrict or throttle the pressure fluid flow through the passage in the control valve 7, a pressure differential is established across said valve device creating a fluid pressure in the brake system 1 and in the housing channel 18. This fluid pressure acts on the effective area of the piston 31 to move the piston assembly 13 axially relative to the housing 12 into frictional engagement with the friction lining 17. This movement of the piston assembly 13 relative to the O ring seals 22 and 23 causes them to be distorted or roll in their grooves or side channels 20 and 21. The intense heat generated by the frictional engagement between the friction plate 47 and friction lining 17 is conducted through the friction plate 47 and transferred to the pressure fluid flowing through the circulating chamber 58 and expansion grooves 45 and 46. At the end of the braking application when the throttling rod element 10 returns to its normal position allowing unrestricted pressure fluid flow through the control valve 7, the fluid pressure in the brake system 1 is reduced and the action of the seals 22 and 23 unrolling or returning to normal position in the side channels 20 and 21 provides the force required to retract the piston assembly 13 to inoperative position (Fig. 2).

Since the friction plate base wall 48 is annular, the intense heat generated during a braking application causes the friction plate base wall 48 to expand radially outwardly. This radially outward expansion causes the friction plate flange 49 to be bent or distorted in a radial direction outwardly away from its welded connection with the piston side wall 32 whereby the expansion chamber or groove 45 is enlarged while the friction plate flange 50 is caused to be bent or distorted in a radial direction toward the piston side wall 33 whereby the expansion chamber or groove 46 is reduced in size. When the heat is dissipated, the friction plate base wall 48 contracts and the friction plate 47 substantially reassumes its original position relative to the piston 31. It is now apparent that the peripheral expansion groove 46 in the piston side wall 33 permits the radial movement or bending of the friction plate flange 50 without exerting any force tending to bend or distort the free end of the piston side wall 33 whereby no permanent distortion of the piston side wall 33 can occur. Inasmuch as the friction plate flange 49 is moved in a radial direction away from the piston side wall 32, permanent distortion of the side wall 32 cannot take place.

It is apparent that the cross-passages 44 in the free ends of the piston side walls provide communication between the expansion grooves 45 and 46 and the chamber 52 for the passage of cooling pressure fluid. Accordingly, substantially the entire inner surface of the friction plate 47 is exposed to the circulating pressure fluid whereby better heat dissipation is provided.

The present piston assembly 13 also obviates the need for internal seals which are subject to heat deterioration since the flanges of the friction plate are telescopically positioned with the piston side walls and fixedly and sealably attached thereto by annular filet welds 53 or the like.

Referring now to Fig. 5, the present method of assembling the friction plate 47 and the piston member 31 to form the piston assembly 13 includes the pre-assembly steps of positioning the baffle plates 56 and 57 in the circumferential grooves 54 and 55 of the adjacent piston side walls 32 and 33, and telescoping the flanges 49 and 50 of the friction plate 47 with the remote surfaces of the piston side walls 32 and 33. Thus, the friction plate 47 is in pre-assembled position with the piston member 31 and the free ends of the piston side walls 32 and 33 are abutting the friction plate base wall 48.

An annular expansion ring 62 is pressed into position against the flange 50 of the friction plate 47 thereby effecting a light press fit between the abutting surfaces of the piston side wall 33 and the friction plate flange 50. An annular compression ring 63 is positioned about the outer surface of the friction plate flange 49 to cause a light press fit between this flange and the piston side wall 32. When thus arranged, the rings 62 and 63 are aligned with the free end margins of the friction plate flanges 49 and 50 and form expansion and compression means to hold the abutting portions of the friction plate flanges in a sealed condition with the side walls of the piston member.

Annular clamping plates or blocks 64 and 65 are then positioned in abutting relationship with the base walls 34 and 48 of the piston member 31 and friction plate 47 and the clamping plates 64 and 65 are held in position by a plurality of C-clamps 66 or the like. Accordingly, the friction plate 47 and piston member 31 are held in assembled relationship by the axial pressures exerted thereagainst by the clamping plates 64 and 65 to prevent warpage of the piston assembly 13 during welding or brazing.

A brazing material, such as silver solder or the like, is positioned at the free ends of the friction plate flanges 49 and 50 and against the piston side walls 32 and 33 to form annular rings of material therebetween. The brazing material is then heated to liquifying temperature and then cooled to form the continuous filet welds 53 permanently securing the friction plate 47 and piston member 31 together.

It is now apparent that the clamping plates 64 and 65 exert axial pressures maintaining the piston assembly 13 in assembled non-warping condition, and that the annular expansion and compression rings 62 and 63 exert radial pressures maintaining the side walls of the piston member and friction plate in abutting sealed condition whereby the brazing material is prevented from entering and blocking the peripheral expansion grooves 45 and 46 between the respective side walls of the piston member 31 and friction plate 47.

The present disclosure is intended to cover all changes and modifications of the present invention which will be apparent to one skilled in the art and which do not constitute departures from the spirit and scope thereof, the present invention being limited only by the claims which follow.

What I claim is:

1. An annular piston assembly comprising a piston member and a friction plate member secured together to define a chamber for pressure fluid, said members having telescoped side walls having a fixed surface abutment adjacent to the end of said side wall of said friction plate member, an expansion groove formed between said side walls and between the surface abutment and the end of the side wall of said piston member, and passage means providing fluid circulating communication between said groove and the chamber.

2. An annular piston assembly comprising a piston member and a friction plate member secured together to define a chamber for pressure fluid, spaced inlet and outlet means for said chamber, said members having telescoped side walls in sealed surface abutment adjacent to the end of said side wall of said friction plate member, an expansion groove formed between said side walls extending from said surface abutment to the end of said side wall of said piston member, spaced openings intermediate said inlet and outlet means forming passages between said groove and said chamber, and other means for circulating pressure fluid in said chamber and through the passage means and groove.

3. An annular piston assembly comprising first and second members each having side walls and a base wall secured together in telescoped relationship to define a chamber for pressure fluid, spaced inlet and outlet means for said chamber, the ends of the side walls of one of said members being in abutment with the base wall of the other of said members and the ends of the side walls of said other of said members being in fixed surface abutment with the side walls of said one of said members, an expansion groove formed between the side walls of said members and between said surface abutment and the ends of the side walls of said one of said members, and passage means in the side walls of said one of said members intermediate said inlet and outlet means extending between said groove and chamber.

4. An annular piston assembly for a disc brake comprising a piston member having side walls and a base wall, a friction plate having side flanges and a base wall, said side walls being fitted into said side flanges and in abutment with said base wall of said friction plate, said side walls and flanges having fixed surface abuments adjacent to the end of said side flanges, expansion grooves formed between said side walls and flanges between the surface abutment and the ends of said side walls, and a plurality of spaced apertures in each of said side walls in communication with said grooves.

5. An annular piston assembly for a disc brake comprising a piston member and a friction plate secured together to define a chamber for pressure fluid, said piston member including an annular side wall and a base wall, said friction plate including an annular side flange and a base wall, said side flange overlapping said side wall and having a continuous sealed surface abutment adjacent to the end of the former, a continuous groove formed in said side wall adjacent to the end thereof, a plurality of passages in said side wall in communication with the groove and with the base wall of said friction plate, and means for circulating pressure fluid through said chamber against said base wall of said friction plate and through said groove against the side flange.

6. A piston assembly comprising first and second members formed of rigid and relatively expandable metals respectively, said second member having a surface for frictional engagement and side flanges extending away from said surface and telescopically receiving said first member, the end portions of said side flanges being secured in sealed condition to said first member, an expansion grove formed between at least one of said side flanges and said first member for accommodating thermal expansion of said second member in the plane of said friction surface and relative to said first member without distortion of said first member, and means for circulating cooling fluid between said members and in said expansion groove.

7. An annular piston assembly comprising first and second members each having side walls and a base wall secured together to form a chamber for pressure fluid, spaced apart fluid inlet and outlet means for said chamber, a baffle extending between said inlet and outlet means in said chamber and dividing said chamber into a static fluid chamber remote from said second member and a circulating fluid chamber in communication with the interior of said second member base wall, the ends of the side walls of one of said members being in fixed surface abutment with the side walls of said other member in spaced relation with the plane of said second member base wall, and an expansion groove between adjacent side walls of said members in communication with said circulating fluid chamber.

8. An annular piston assembly for a disc brake comprising a piston member having a base wall and side walls, a friction plate having a base wall with a friction surface and side flanges extending away from said friction surface, said side walls and flanges being in overlapping relation and having a fixed sealed abutment at the ends of the side flanges, an internor chamber between said piston member and friction plate having an inlet and an outlet thereto in spaced relation, baffle means extending from said inlet to adjacent said outlet defining a circulation chamber for cooling fluid in communication with the interior of said friction plate base wall, continuous grooves between adjacent side walls and flanges extending from adjacent the sealed end portions of the latter to the friction plate base wall, and a plurality of spaced openings between said inlet and outlet to provide communication between said fluid circulation chamber and said grooves whereby substantially all of the interior surface of said friction plate is in communication with cooling fluid in said circulation chamber and grooves to dissipate heat generated during braking applications, and said grooves permitting thermal expansion of said friction plate relative to said piston member without exerting distortion producing forces thereon.

References Cited in the file of this patent

UNITED STATES PATENTS

| | | |
|---|---|---|
| 1,633,919 | Berger | June 28, 1927 |
| 1,874,624 | Rice et al. | Aug. 30, 1932 |
| 2,366,164 | Weick et al. | Jan. 2, 1945 |
| 2,406,304 | Levy | Aug. 20, 1946 |
| 2,453,237 | Le Tourneau | Nov. 9, 1948 |
| 2,566,011 | Williams | Aug. 28, 1951 |
| 2,821,273 | Sanford et al. | Jan. 28, 1958 |
| 2,880,823 | Sedergren | Apr. 7, 1959 |